United States Patent
Gmuend et al.

(10) Patent No.: US 11,070,104 B2
(45) Date of Patent: Jul. 20, 2021

(54) STATOR OF AN ELECTRICAL MACHINE, AN ELECTRICAL MACHINE, AND METHOD FOR PRODUCING SAME

(71) Applicant: Robert Bosch GmbH, Stuttgart (DE)

(72) Inventors: Torsten Gmuend, Rastatt-Pliitersdorf (DE); Armin Stubner, Buehl-Altschweier (DE); Helmut Meier, Renchen (DE)

(73) Assignee: Robert Bosch GmbH, Stuttgart (DE)

( * ) Notice: Subject to any disclaimer, the term of this patent is extended or adjusted under 35 U.S.C. 154(b) by 167 days.

(21) Appl. No.: 16/461,917

(22) PCT Filed: Nov. 8, 2017

(86) PCT No.: PCT/EP2017/078524
§ 371 (c)(1),
(2) Date: May 17, 2019

(87) PCT Pub. No.: WO2018/091318
PCT Pub. Date: May 24, 2018

(65) Prior Publication Data
US 2019/0334400 A1   Oct. 31, 2019

(30) Foreign Application Priority Data

Nov. 17, 2016 (DE) .................. 10 2016 222 614.2

(51) Int. Cl.
*H02K 3/32* (2006.01)
*H02K 1/14* (2006.01)
(Continued)

(52) U.S. Cl.
CPC ............ *H02K 3/325* (2013.01); *H02K 1/146* (2013.01); *H02K 15/022* (2013.01); *H02K 15/105* (2013.01); *H02K 15/12* (2013.01)

(58) Field of Classification Search
CPC ...... H02K 3/325; H02K 1/146; H02K 15/022; H02K 15/105; H02K 15/12; H02K 3/345; H02K 1/185
See application file for complete search history.

(56) References Cited

U.S. PATENT DOCUMENTS

2018/0062473 A1 * 3/2018 Horng .................... H02K 3/345

FOREIGN PATENT DOCUMENTS

| CN | 102857054 A | 1/2013 |
|---|---|---|
| CN | 103210569 A | 7/2013 |

(Continued)

OTHER PUBLICATIONS

International Search Report for Application No. PCT/EP2017/078524 dated Jan. 25, 2018 (English Translation, 3 pages).

*Primary Examiner* — Thomas Truong
(74) *Attorney, Agent, or Firm* — Michael Best & Friedrich LLP

(57) ABSTRACT

The invention relates to a stator (16) of an electrical machine (10), to an electrical machine (10), and to a method for producing same, particularly for adjusting movable parts in a motor vehicle, comprising a pole casing (15) to the inner wall (115) of which winding holders (36) carrying electric coils (17) are applied, the winding holders (36) comprising a stator tooth (120) which is formed on a yoke element (118) which is radially applied to the inner wall (115), and an insulating mask (61) is arranged on the winding holder (36), which insulates the electric coil (17) from the winding holder (36), and the insulating mask (61) extends with an axial projection (102) axially over the yoke element (118), the axial projection (102) being radially applied to the inner wall (115) of the pole casing (15) with a shoulder (108) extending in the peripheral direction (2).

17 Claims, 3 Drawing Sheets

(51) Int. Cl.
*H02K 15/02* (2006.01)
*H02K 15/10* (2006.01)
*H02K 15/12* (2006.01)

(56) References Cited

FOREIGN PATENT DOCUMENTS

| | | |
|---|---|---|
| CN | 103545965 A | 1/2014 |
| CN | 103987955 A | 8/2014 |
| CN | 105359382 A | 2/2016 |
| DE | 10261617 | 7/2004 |
| EP | 0544537 | 6/1993 |
| EP | 1501170 | 1/2005 |
| GB | 2273823 | 6/1994 |
| WO | 2004062067 | 7/2004 |

\* cited by examiner

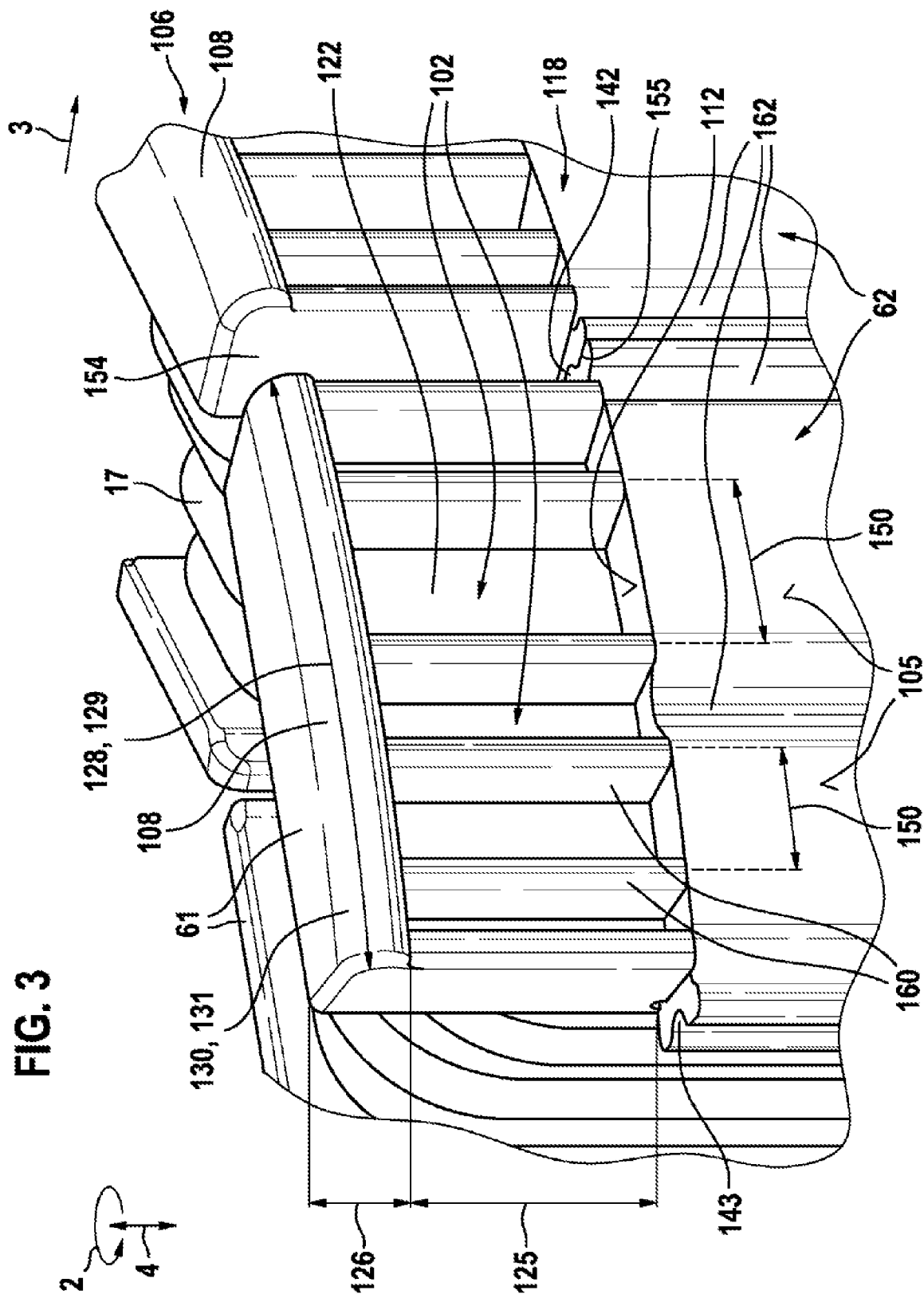

STATOR OF AN ELECTRICAL MACHINE, AN ELECTRICAL MACHINE, AND METHOD FOR PRODUCING SAME

BACKGROUND OF THE INVENTION

The invention relates to a stator of an electrical machine, to an electrical machine, and to a method for producing same.

Made known by DE 10 261617 A1 is an electrical machine in which a connection of the stator to the pole housing, made of metal, is effected by means of a shrink process. The pole housing in this case is heated and the stator lamination pack is inserted in the heated state. Upon cooling, the housing shrinks, and as a result sits tightly on the stator. In order to achieve a greater press fit, in this case the stator is pressed into the pole housing, metal shavings being produced as the sheet-metal laminations are pushed into the metal housing. During the assembly process, such shavings can become distributed inside the motor housing, and thus also impair the functioning of the electronics. However, such a strong press fit is necessary, in particular, in order for individually produced stator segments to be reliably positioned and permanently fixed in the pole housing.

SUMMARY OF THE INVENTION

The stator according to the invention, the electrical machine according to the invention, and the method according to the invention, for producing such a machine, have the advantage that the formation of a circumferential collar on an axial extension of the insulation mask prevents metal shavings from being able to become freely distributed in the motor housing when the stator is pressed into the pole housing. The collar of the insulation mask, extending in the circumferential direction, in this case is radially tightly contiguous with the inner wall of the pole housing, such that the shavings that are produced can be held captive between the insulation mask and the inner wall of the housing. Free-moving metal shavings inside the housing are thereby prevented from being able to produce an electrical short circuit at the current-carrying parts.

The collar radially contiguous with the inner wall of the pole housing, together with the stator pack, in this case forms a receiving space in which shavings produced during the pressing-in operation, or other dirt particles, remain enclosed. If, for example, during the operation of pressing the sheet-metal laminations into the pole well, shavings are produced at the end face of the lamination pack, during the further pressing-in operation they are held captive between the contiguous collar and the end face of the lamination pack.

Particularly advantageously, axially extending webs of the insulation laminations, which likewise are radially contiguous with the inner wall of the pole housing, are realized between the contiguous collar and the end face of the lamination pack. As a result, the individual receiving spaces are also closed off in the circumferential direction by the axial webs. The circumferential collar can thus be realized as a plurality of individual angular segments, having gaps arranged between them, the receiving pockets being reliably closed by the axial walls of the webs. The axial webs are radially contiguous with the axial extension of the insulation mask, such that, by means of the axial webs, the circumferential collar is also reliably contiguous with the inner wall of the pole housing.

In a preferred embodiment of the stator, the insulation mask has a collar contiguous with the inner wall only at one axial end. This is sufficient, since the stator pack is pressed only once in one direction into the pole housing, and thus metal particles can be released only at one axial end face of the lamination pack during the pressing-in operation. Preferably, the connection wires for interconnecting the electrical windings are arranged on the end face of the lamination pack that is opposite to the insertion direction. They can thus easily be electrically contacted, even if the lamination pack is inserted into a closed pole well, at the free, open side of the pole well.

If the lamination pack is produced in a plurality of individual stator segments realized separately in the circumferential direction, these single segments are arranged in a ring and pressed into the pole housing. In order for the individual stator segments to be reliably positioned in a permanent manner in relation to each other, a high pressing force, into the pole housing, is required. These separately produced stator segments preferably have a single tooth winding, in which each stator segment respectively has its own insulation mask. Such an insulation mask may be realized, for example, in two parts, in which respectively one half is pushed from each axial side onto the stator tooth.

In the case of such an embodiment having single stator segments, the sheet-metal laminations are mutually contiguous in the circumferential direction, the insulation masks preferably not touching each other in the circumferential direction. Gaps are thus realized in the circumferential direction between the respective insulation masks of the individual segments. The collar extending in the circumferential direction is thus not realized so as to be continuous over the entire circumference, but is subdivided, according to the number of single stator segments, into single angular segments of individual insulation laminations, and thus also of individual angular ranges of the circumferential collar. These individual angular segments of the circumferential collar then always have at least two axial webs which, with the circumferential angular segment of the collar and the lamination pack, form the walls of the receiving space. Such a realization of individual stator segments, having separate insulation mask that have a single tooth winding, has the advantage, in comparison with a stator composed of annular sheet-metal laminations, that a higher slot space factor can be achieved by the single tooth winding.

In order to achieve a defined press fit of the stator within the pole housing, the stator pack is not contiguous with the inner wall of the pole housing over the entire circumference. Rather, only defined pressure application regions are realized, which extend over a particular angular range. Realized between them are angular ranges at which the stator pack is not supported radially on the inner wall. For example, realized in each case between individual single stator segments, where the latter are not mutually contiguous in the circumferential direction, are such angular range at which the stator is not radially contiguous with the inner wall of the pole housing. The collar of the insulation lamination extending in the circumferential direction therefore preferably extends exclusively over the angular ranges at which the stator laminations are radially contiguous with the inner wall of the pole housing. In a preferred embodiment, the pressure contact region in the circumferential direction also does not extend over the entire angular range of a single stator segment, but only over selected angular ranges of the single stator segment. It is advantageous in this case to realize the axial webs at the limits of the angular range of the pressure application regions, since the distance in the circumferential direction between the axial webs can thereby be reduced.

Since, when the stator is being pressed-in, the shavings are produced only in the angular range of the pressure application regions, the axial webs may be correspondingly arranged in the circumferential region in which the stator is not pressed radially against the inner wall of the pole housing. It is thereby ensured that, wherever the axial end surface of the stator laminations forms a pressure application region with the inner wall, a closed receiving space, which holds the resulting metal particles captive, is always realized over the entire angular range of the pressure application region.

Preferably, a single stator segment has two separately realized pressure application regions, which are arranged at a distance apart from each other in the circumferential direction. Realized between these two pressure application regions there is a radial depression on the outer circumference of the stator segment, in which no press fit is produced. If these two pressure application regions are arranged non-symmetrically on the single stator segment with respect to the circumferential direction, this asymmetry can be used to predefine the axial alignment of the single segments for the winding operation and for the operation of pressing into the housing.

In order that, during the pressing-in operation, the collar of the insulation mask allows the pole housing to be inserted more easily, realized at the end face of the collar, on the radial outer side, is a radius or a phase, which serves as an insertion aid when the stator is being pressed axially into the housing. In this case the diameter of the collar increases in the axial direction in such a manner that the circumferential edge of the collar is radially contiguous, in a reliably sealing manner, with the inner wall of the pole housing. The collar thus forms a type of circumferential sealing lip, which closes off the receiving space at the axial end face of the stator.

Preferably, the axial webs are directly contiguous with the uppermost sheet-metal lamination of the stator pack, opposite to the collar in the axial direction. The uppermost sheet-metal lamination, which is pressed radially against the inner wall of the pole housing, thus forms the surround of the receiving space that is axially opposite the collar.

To produce an electrical machine, the connections of the windings of the stator are electrically interconnected. For this purpose, an electronics unit, which connects the connection wires of the electrical windings to each other, is arranged at an open side of the pole housing. On the side of the stator that is opposite this electronics unit, the windings advantageously do not have any free connection wires, such that, on this side, the stator can be pushed, against a closed base surface of the pole housing, into the latter. In this case, the receiving pockets of the insulation mask are always arranged on the axial side of the stator on which the latter is pushed into the pole housing.

In the production of the electrical machine, it is particularly favorable to insert the stator, into the pole housing, first by the axial end face at which the end surface of the uppermost lamination is formed by the punch draw-in side. This means that, here, the radially outer edge at the end surface of the stator pack does not form a punch burr as a result of the draw-in of the uppermost sheet-metal lamination in a punching die. Instead, in the sheet-metal stack of the lamination pack, on the axially opposite side, the end surface of the stator pack is then realized with a corresponding punch burr of the outermost sheet-metal lamination. If the punch draw-in side is inserted first at the axial end surface of the stator pack into the pole housing, the creation of metal shavings can be reduced significantly. Accordingly, the collar of the insulation lamination, which extends in the circumferential direction and which is radially contiguous with the inner wall of the pole housing, is likewise realized on this axial side of the stator. For the purpose of producing the electrical machine, the stator may be pressed into a pole housing in a cold state, in which case very high pressing-in forces are required here. Alternatively, the pole housing may be heated, and the stator consequently pressed into the pole housing with a reduced pressing-in force. The production of metal shavings can also be reduced by this method.

BRIEF DESCRIPTION OF THE DRAWINGS

Further features of the invention will become apparent from the further expositions of the description and from the drawings, as described in the following exemplary embodiments of the invention.

FIG. 3 shows a partial view of a further exemplary embodiment.

DETAILED DESCRIPTION

Figure 1:
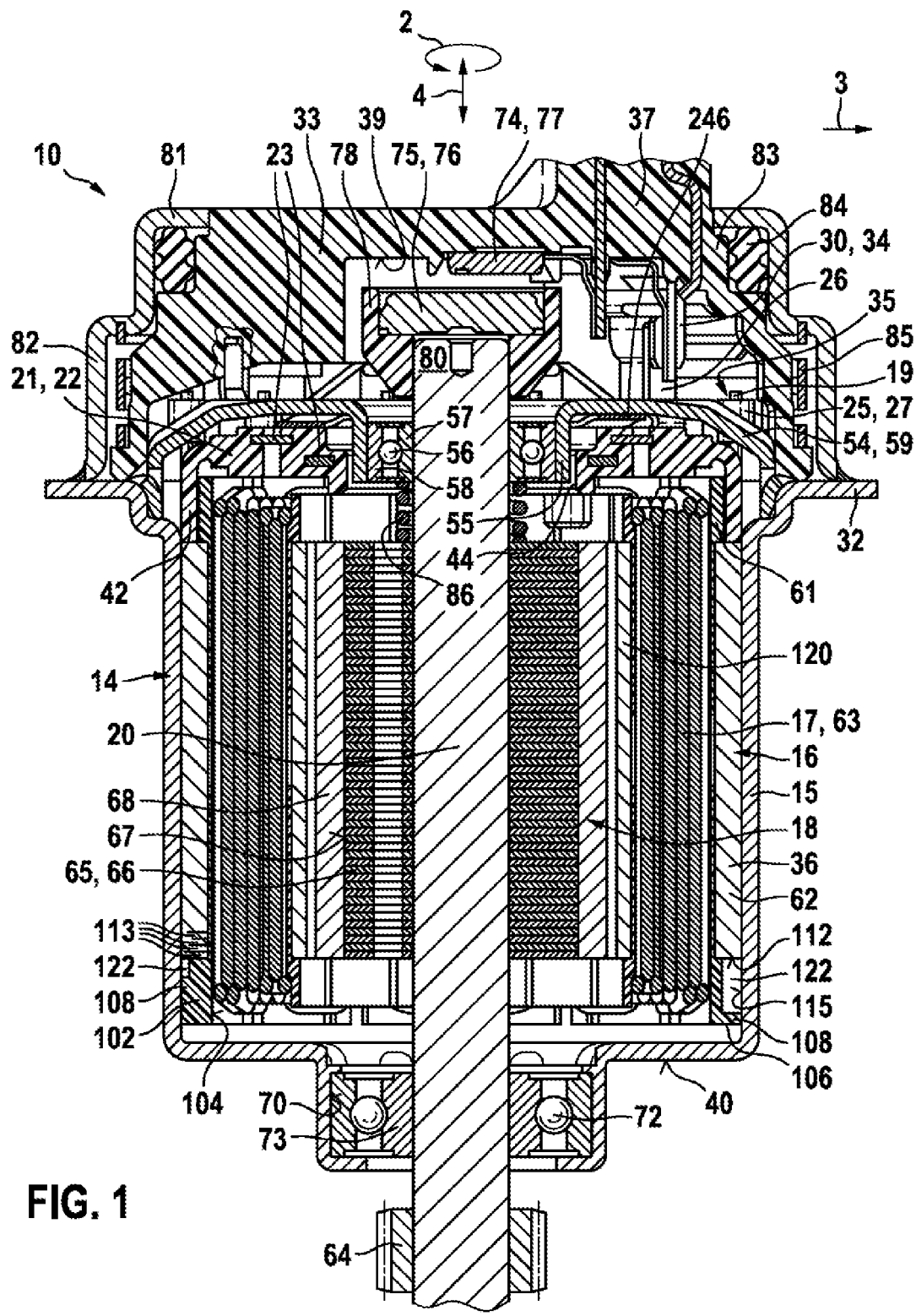
FIG. 1 shows an embodiment of an electrical machine according to the invention.

FIG. 1 shows an exemplary embodiment of a fully assembled electrical machine 10, in which there is a stator 16 inserted in a housing 14 of an electrical machine 10. The stator 16 in this case has coil carriers 36, which for example are realized separately as single segments 62, and which are wound with electrical windings 17. The housing 14 in this case serves as a pole well 15, which forms a magnetic return for the electrical windings 17. At its open end the pole well 15 has a flange 32, onto which further components are placed. In the exemplary embodiment according to FIG. 1, the pole well 15 has, at its base 40, an opening, through which there projects a rotor shaft 20, in order to transmit a torque of the electrical machine 10, via an output element 64, to a transmission element that is not represented. Formed on the base 40 there is a first bearing seat 70, inserted in which there is a first rolling bearing 72. The inner ring 73 of the first rolling bearing 72 in this case is fixedly connected to the rotor shaft 20. The first rolling bearing 72 thus forms a fixed bearing for the rotor 18. The rotor 18 has a rotor body 65, which carries permanent magnets 68 that act in combination with the electrical windings 17. The rotor body 65 is composed, for example, of individual stacked lamination sheets 66, punched-out in which there are cutouts 67 for the permanent magnets 68. The coil-wire ends 19 of the windings 17 project beyond the electrical coils 63 in the axial direction 4. There is an interconnection plate 22 placed axially onto the stator 16, conductor elements 23 projecting out of a plastic body 21 being connected, at fastening portions 25, to the coil wire of the coils 63. In this case the electrical connections between the coil wire and the fastening portions 25 are formed, for example, by welding, soldering or crimping. In the exemplary embodiment described, precisely three conductor elements 23 have, respectively, a connection pin 26 for the phases U, V and W. The plastic body 21 is supported in the axial direction 4 on the stator 16, via formed-on spacers 42. The spacers 42 of the interconnection plate 22 are formed-on at the radially outer periphery thereof. In the exemplary embodiment, the spacers 42 are contiguous with the coil-carrier elements 36 onto which the electrical windings 17 are wound. The coil-carrier elements 36 are realized here as single segments 62 for each coil 63. In this case, arranged on the coil-carrier elements 36, radially within the spacers 42, there is a respective insulation mask 61 for the electrical windings. The plastic body 21 is realized in the form of a ring, such that the rotor shaft 20 of the rotor 18 can extend through in its central opening 44.

Arranged axially above the interconnection plate 22 is an end plate 54 which, at its radially outer periphery, is welded to the pole well 15. The end plate 54 has a second bearing seat 55, which engages axially in the central opening 44 of the interconnection plate 22. Accommodated in the second bearing seat 55 is a second rolling bearing 56, by means of which the rotor shaft 20 is rotatably mounted in the stator 16. The second rolling bearing 56 is realized, for example, as a ball bearing, and constitutes a floating bearing for the rotor 18. In this case, an outer ring 58 of the second rolling bearing 56 is fastened in a rotationally fixed manner in the second bearing seat 55, and the inner ring 57 is fastened in an axially displaceable manner on the rotor shaft 20. The second rolling bearing 56 in this case is arranged axially in the same plane as the interconnection plate 22, such that the electrical machine 10 is realized in a very compact manner in the axial direction 4. In the exemplary embodiment, the end plate 54 has individual radial webs 59, projecting through between which, axially upward, are the fastening portions 25 realized as receiving sleeves 27. The coil-wire ends 19 of the coils 63 are inserted in holes 35 of the receiving sleeves 27. Likewise, the connection pins 26 extend from the plastic body 21 through the end plate 54, to enable them to be connected to corresponding contacts 30 of the connection plug 37. For the purpose of vibration damping, the interconnection plate 22 is pressed, by axial spring means 246, axially downward from the end plate 54 against the coil carriers 36. The spring means 246 generates an axial bias, which holds the interconnection plate 22 exactly positioned, including over a large temperature range and in the case of high vibration loads. Since the spring means 246 are realized so as to be independent from the end plate 54, the elasticity of the material can be optimally adapted to the temperature differences and to the occurring accelerations. The rotor 18 is axially biased, by means of a compression spring 86, with respect to the second rolling bearing 56. The compression spring 86 is supported, on the one hand, on the rotor body 65 and, on the other hand, on the inner ring 57 of the second rolling bearing 56.

Arranged above the end plate 54 is a connector housing 33, arranged on which is the outer connection plug 37, not represented in greater detail, for supplying electric power to the electrical machine 10. Arranged on the connector housing 33, on its inner side 39, are the electrical contacts 30, which are connected to the connection pins 26 of the interconnection plate 22. The interconnection plate 22 is connected both to the coil-wire ends 19 and to the electrical contacts 30 of the connection plug 38. For example, the electrical contacts 30 extend axially downward as contact lugs 34, such that they are arranged directly adjacent to the connection pins 26 and are then, for example, welded to each other. Fastened in the connector housing 33 is a sensor element 74, which acts in combination with a signal generator 75 on the rotor shaft 20, in order to sense its rotor position. For this purpose, following the mounting of the end plate 54, a magnet holder 78, which accommodates a sensor magnet 76, is pressed-on at the free end 80 of the rotor shaft 20. Its rotating magnetic field is sensed by the sensor element 74, which is realized as a high-resolution magnetic-field sensor 77. Joined to the connector housing 33 there is a metal cover 81, which is fixedly welded in a tight manner to the flange 32 of the pole well 15. Both the connector housing 33 and the metal cover 81 each have a circular circumferential wall 82, 83, which are arranged radially next to each other. Pressed-in between the connector housing 33 and the inner wall of the metal cover 81 is a radial sealing ring 84, which seals the electrical machine 10 toward the connection plug 37. Furthermore, arranged between the connector housing 33 and the metal cover 81 is an axial spring element 85, which presses the connector housing 33 axially against the flange 32 of the pole well 15.

In the exemplary embodiment, the insulation mask 61 has an axial extension 102, which projects beyond the winding carriers 36 in the axial direction 4, at the lower end. The axial extension 102 in this case forms a radial bearing contact surface 104 for the electrical coils 17. Realized at the axial end 106 of the axial extension 102, on the radially outer side, is a collar 108, which extends in the circumferential direction 2 and which is tightly contiguous with an inner wall 115 of the pole housing 15 in the radial direction 3. The axial extension 102 is contiguous with an end surface 112 of the winding carrier 36, axially opposite to the axial end 106. The winding carrier 36 is composed, for example, of individual stacked sheet-metal laminations 113, and has a yoke element 118, on which at least one stator tooth 120 extends radially inward. In the represented section through the yoke element 118, by means of a radial outer wall 119 it is radially contiguous, with a press fit, with an inner wall 115 of the pole housing. A cavity, which serves as a receiving space 122 for dirt particles and/or metal shavings, is realized axially between the collar 108, extending in the circumferential direction 2, and the end face 112 of the lowermost sheet-metal lamination 113. If, in the production of the electrical machine 10, the stator 16 is pressed axially into the pole housing 15, metal fragments, which are produced by the friction between the sheet-metal laminations 113 and in the inner wall 115, are held captive in the receiving space 122. The sheet-metal laminations 113 in this case may be realized as single-piece ring laminations that are closed in the circumferential direction 2, or as individual angular segments that belong to a plurality of individual segments 62 of the stator 16. Accordingly, the collar 108 may likewise be realized as a closed annular collar, or as a plurality of separate angular ranges 128, which belong to the individual insulation laminations 61 of the respective single tooth segments 62. On the left side, the receiving space 122 is relatively small, such that its radial dimension 123 is less than the rest of the radial extent 124 of the axial extension 102. Likewise, the axial extent 125 of the receiving space 122 is less than the rest of the axial extent 126 of the axial extension 102.

By contrast, in the case of an alternative embodiment, on the right side the radial extent 123 of the receiving space 122 is greater than the radial extent 124 of the axial extension 102 in this region. Likewise, the axial extent 125 of the receiving space 122 is greater than the total axial extent 126 of the axial extension 102 as far as the end face 122. By contrast, at the axially opposite end of the stator 16, in the region of the flange 32, the insulation lamination 61 does not have a collar that is radially contiguous with the inner wall 115. Instead, here the spacers 42 of the interconnection plate 22 are arranged radially between the insulation lamination 61 and the inner wall 115. Since also virtually no metal shavings are produced at this end of the winding carriers 36, it is possible there to dispense with an arrangement of receiving spaces 122 for the metal fragments. On this side, the coil-wire ends 19 are electrically connected to the interconnection plate 22, such that there are no open coil-wire ends arranged at the opposite axial end 106 of the winding carriers 36. In the exemplary embodiment, the axial extension 102 extends, with the collar 108, approximately to a closed base 40 of the pole housing 115. Owing to the receiving spaces 122 arranged there, the metal shavings are prevented from migrating radially inward along the base 40 and being swirled around there by the rotation of the rotor 18.

Figure 2:
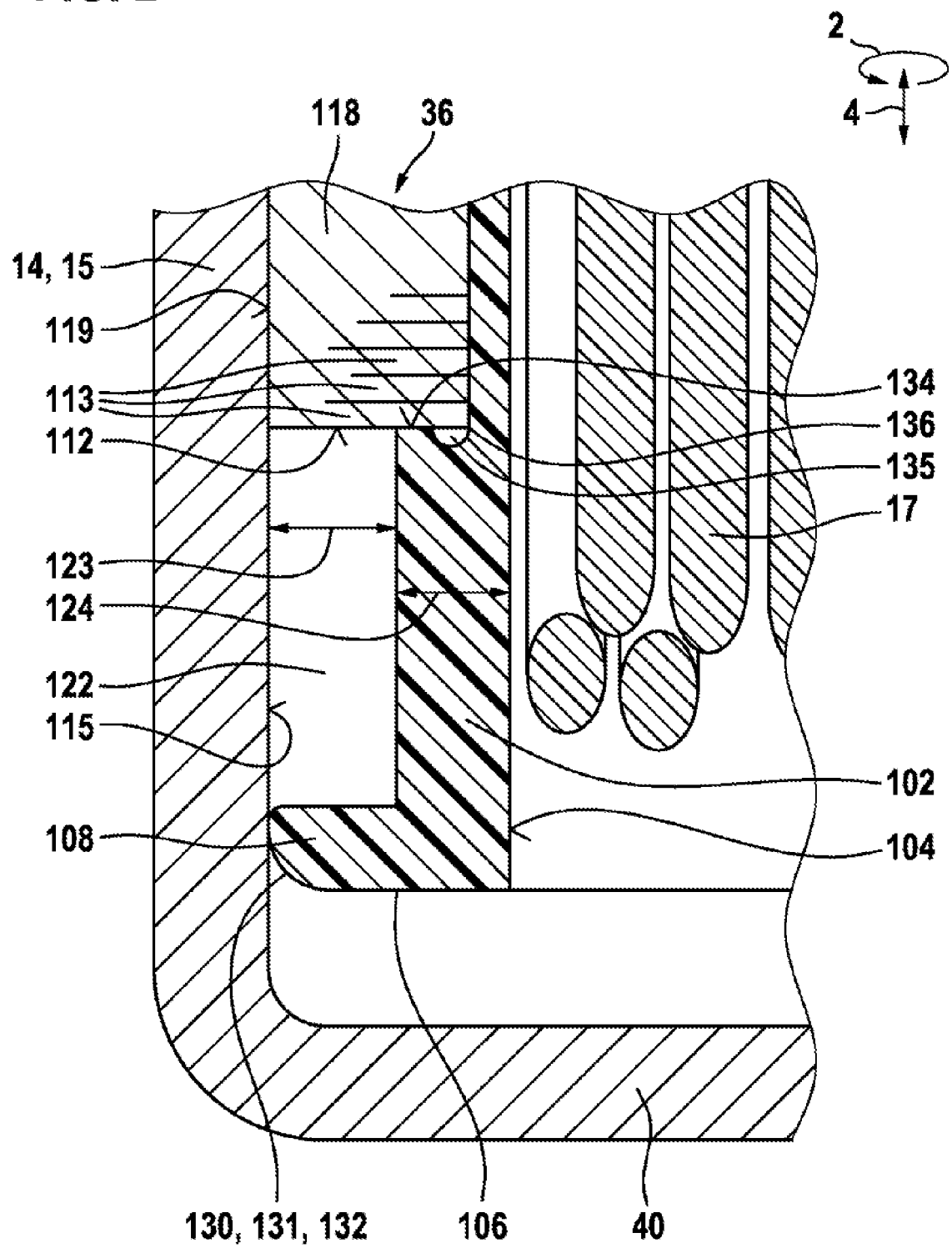
FIG. 2 shows a detail view of a further exemplary embodiment, in section.

Represented in FIG. 2 is a detail view of a further exemplary embodiment, in which the receiving space 122 is represented in enlarged form. The receiving space 122 is again realized between the end face 112 of the yoke element 118 and the collar 108 that extends in the circumferential direction 2. In the case of this embodiment, however, the circumferential collar 108 has a radius 130 that is realized as an insertion phase 131 in the insertion of the winding carriers 36 into the pole housing 15. As a result, in the insertion of the winding carriers 36 into the pole housing 15, the collar 108 slides more easily into the pole housing 15. Starting from the axial end 106 of the axial extension 102, the diameter of the collar 108 increases contrary to the direction of insertion. As a result, the collar 108 forms a type of sealing lip 132, which is pressed radially against the inner wall 115. The receiving space 122 for the dirt particles is thereby closed off in a tight manner, such that they cannot become freely distributed in the housing 14. The insulation mask 61 is produced, for example, from plastic—preferably by means of injection molding—such that it has a certain elasticity, in order to be pressed radially against the inner wall 115. Relieved on a face 134 of the axial extension 102 that faces toward the end face 112 is a recess 135, into which a radially inner edge 136 of the last sheet-metal lamination 113 can extend. In the exemplary embodiment of FIG. 2, the axial extension 102 is arranged with the circumferential collar 108 on the axial side at which the end surface 112 of the lowermost sheet-metal lamination 113 is arranged with a draw-in side downward. This means that the punch burr of the lowermost sheet-metal lamination 113 is not arranged at the end face 112, but the punch burr faces toward the other sheet-metal laminations 113 and away from the end surface 112. As a result, fewer metal shavings are produced when the yoke element 118 is being pressed into the pole housing 15.

FIG. 3 shows a further detail view of single tooth segments 62 arranged next to each other in the circumferential direction 2. By means of a nose 142, the single tooth segments 62 engage, in the circumferential direction 2, in a corresponding groove 143. Within the pole housing 15, in the circumferential direction 2, a plurality of such single segments 62 form a closed stator 16. Arranged on each single segment 62 is an insulation lamination 61, which is preferably composed of two axial halves, each of which are pushed axially in the opposite direction onto the winding carriers 36. In this example, each single segment 62 is then wound with a single electrical coil 17, in which case, for example, two adjacent single segments 62 may also be inter-wound with a continuous wire. FIG. 3 shows the axial end 106 that is opposite the coil-wire ends 19. Unlike FIG. 2, in FIG. 3 the pressing-in direction would here be represented as being axially upward. The collar 108 extending in the circumferential direction 2 extends here only over a certain angular range 128 that here corresponds to the angular range 129 of the insulation lamination 61 of a individual single segment 62. Realized in this case between the individual angular ranges 128 of the collar 108 in the circumferential direction 2 are gaps 154, which in the region of the parting aces 155 are arranged between the individual single segments 62 in the circumferential direction 2. In the case of these single segments 62, in each case an individual yoke element 118 has a stator tooth 120. Here, the yoke segment 118 has, with respect to the circumferential direction 2, a plurality of pressure application surfaces 105, realized separately from each other, which realize the press fit to the inner wall 115. In the circumferential region 150 of these pressure application surfaces 105, metal shavings are produced by the sheet-metal laminations 113 of the yoke elements 118 during the pressing-in operation. In this case, in this exemplary embodiment, axial webs 160, which all together form the circumferential walls for the receiving spaces 122, are realized between the end face 112 of the yoke element 118 and the circumferential collar 108. The axial webs 160 are arranged at the limits of the pressure application surfaces 105 with respect to the circumferential direction 2, such that the receiving space 122 extends according to the angular range 150 of the pressure application surfaces 105. The axial webs 160 are supported axially on the circumferential collar 108 and on the end face 112, and in the radial direction 3 are pressed against the inner wall 115, as are also the collar 108 and the pressure application surfaces 105. In the exemplary embodiment of FIG. 3, for example a single segment 62 has precisely two pressure application surfaces 105 with respect to the circumferential direction 2, which are separated from each other by a radial depression 162 on the radial bearing contact surface 119 of the yoke element 118. There are no closed receiving spaces 122 realized in the region of the radial depressions 162, since here the cavity is open as a result of the radial depression in the form of an axial groove along the outer side 119 of the yoke element 118. For example, the pressure application surfaces 105 have differing magnitudes of angular range 150. This asymmetrical realization of the outer surface 119 of the yoke segments 118 enables the axial end faces of the winding carriers 36 to be defined.

It is to be noted that, with regard to the exemplary embodiments shown in the figures and the description, there are numerous possibilities for combining the individual features with each other. The invention thus relates both to the use of individual angular segments 62 and to a closed annular stator 16. The arrangement of the receiving spaces may in this case be adapted to the specific design of the outer contour of the sheet-metal laminations 113 with their pressure application surfaces 105. The drive unit 10 of the invention is particularly suitable as an embodiment of an EC motor for adjusting movable components in the motor vehicle. Such an electric motor according to the invention, having metal fragment protection, in this case can be used particularly favorably in the outer region, such as, for example, in the engine compartment, where it is exposed to extreme weather conditions and vibrations.

The invention claimed is:

1. A stator (16) of an electrical machine (10), the stator having a pole housing (15) with an inner wall (115), and the stator having winding carriers (36) that are contiguous with the inner wall (115) and that carry electrical coils (17), wherein the winding carriers (36) have a stator tooth (120), which is formed on a yoke element (118) that is radially contiguous with the inner wall (115), and arranged on the winding carrier (36) is an insulation mask (61), which insulates an electrical coil (17) with respect to the winding carrier (36), and the insulation mask (61) extends axially, with an axial extension (102), beyond the yoke element (118), characterized in that the axial extension (102) includes a collar (108) that is located at a distal end of the axial extension (102), that is spaced from the yoke element (118) and that extends in the circumferential direction (2), wherein the collar (108) is radially contiguous with the inner wall (115) of the pole housing (15).

2. The stator (16) as claimed in claim 1, characterized in that the circumferential collar (108) closes off a receiving space (122) for shavings and fragments, which extends axially between the collar (108) and an end face (112) of the yoke element (118) that extends in the circumferential direction (2).

3. The stator (16) as claimed in claim 2, characterized in that, arranged between the collar (108) and the end face (112), on the insulation mask (61), are axial webs (160), which likewise are radially contiguous with the inner wall (115) of the pole housing (15) and form side walls of the receiving space (122).

4. The stator (16) as claimed in claim 3, characterized in that, with respect to the circumferential direction (2), the end face (112) of the yoke element (118) forms a press fit with the pole housing (15) only in delimited pressure application regions (105), and the receiving spaces (122) are realized, with respect to the circumferential direction (2), only in a region of the pressure application regions (105).

5. The stator (16) as claimed in claim 4, characterized in that the axial webs (160) delimit the pressure application regions (105) in the circumferential direction (2), and the axial webs (160) are arranged at circumferential regions at which the yoke element (118) has a radial depression (162) and is not radially contiguous with the inner wall (115).

6. The stator (16) as claimed in claim 5, characterized in that the yoke element (118) of precisely one winding-carrier segment (62) has, with respect to the circumferential direction (2), precisely two pressure application regions (105), which are separated by the radial depression (162) realized as an axial groove.

7. The stator (16) as claimed in claim 5, characterized in that the yoke element (118) of precisely one winding-carrier segment (62) has, with respect to the circumferential direction (2), precisely two pressure application regions (105), which are separated by the radial depression (162) realized as an axial groove, and the pressure application regions (105) are realized asymmetrically with respect to the axial groove.

8. The stator (16) as claimed in claim 2, characterized in that the collar (108) has, with respect to a direction of insertion into the pole housing (15), a radius (130) or a cone that, in an axial direction (4), transitions into a pressure application lip (132) that tightly closes off the receiving space (122) with respect to the inner wall (115).

9. The stator (16) as claimed in claim 1, characterized in that the collar (108) is arranged only on an axial side of the insulation mask (61) on which the electrical coils (17) do not have free connection wires (19) for interconnecting the coils (17).

10. The stator (16) as claimed in claim 1, characterized in that the stator (16) is composed of a plurality of individually produced winding carrier segments (62), which each have separately realized insulation masks (61).

11. The stator (16) as claimed in claim 1, characterized in that the collar (108) extends only over an angular range (128) of a winding-carrier segment (62), and the shoulder collar (108) is interrupted in the circumferential direction (2) between two winding-carrier segments (61).

12. An electrical machine (10) having a stator (16) as claimed in claim 1, characterized in that an axially open side of the pole housing (15) is closed off by an electronics housing (33), wherein receiving spaces (122) are arranged on a side of the pole housing (15) that is opposite the electronics housing (33).

13. The stator (16) as claimed in claim 1, characterized in that the stator (16) is composed of a plurality of individually produced winding carrier segments (62), which each have separately realized insulation masks (61), which are pushed axially onto stator teeth (120).

14. The stator (16) as claimed in claim 1, characterized in that the collar (108) extends only over an angular range (128) of a winding-carrier segment (62), and the collar (108) is interrupted in the circumferential direction (2) between two winding-carrier segments (61), as a result of which a gap (154) is formed in the collar (108).

15. A method for producing an electrical machine (10) including the stator (16) as claimed in claim 1, characterized in that, for the purpose of realizing the yoke elements (118), individually punched-out sheet-metal laminations (113) are stacked on one another, and the collar (108) of the insulation mask (61), with the receiving pockets (122), is arranged on the axial end face (122) of the yoke element (118) that is formed by the punch draw-in side of the sheet-metal lamination (113), and the yoke elements (118) are pressed into the pole housing (15) first by the side on which the collar (108) is arranged, wherein the shavings and unwanted particles produced by friction are received and held captive in the receiving spaces (122).

16. The method as claimed in claim 15, characterized in that the pole housing (15) is heated, for the purpose of widening it, before the yoke elements (118) are pressed into it.

17. A stator (16) of an electrical machine (10), the stator having a pole housing (15) with an inner wall (115), and the stator having winding carriers (36) that are contiguous with the inner wall (115) and that carry electrical coils (17), wherein the winding carriers (36) have a stator tooth (120), which is formed on a yoke element (118) that is radially contiguous with the inner wall (115), and arranged on the winding carrier (36) is an insulation mask (61), which insulates an electrical coil (17) with respect to the winding carrier (36), and the insulation mask (61) extends axially, with an axial extension (102), beyond the yoke element (118), characterized in that the axial extension (102) is radially contiguous, with a collar (108) extending in the circumferential direction (2), with the inner wall (115) of the pole housing (15), and characterized in that the circumferential collar (108) closes off a receiving space (122) for shavings and fragments, which extends axially between the collar (108) and an end face (112) of the yoke element (118) that extends in the circumferential direction (2).

* * * * *